US012471233B2

(12) United States Patent
Hu et al.

(10) Patent No.: US 12,471,233 B2
(45) Date of Patent: Nov. 11, 2025

(54) SYSTEM AND METHOD FOR A FRAMELESS MODULAR ELECTRONIC DEVICE

(71) Applicant: Huawei Technologies Co., Ltd., Shenzhen (CN)

(72) Inventors: Wenqian Hu, Addison, TX (US); Han Su, Ann Arbor, MI (US); Jian Li, Waltham, MA (US)

(73) Assignee: FutureWei Technologies, Inc., Addison, TX (US)

( * ) Notice: Subject to any disclaimer, the term of this patent is extended or adjusted under 35 U.S.C. 154(b) by 100 days.

(21) Appl. No.: 18/457,723

(22) Filed: Aug. 29, 2023

(65) Prior Publication Data
US 2023/0403802 A1  Dec. 14, 2023

Related U.S. Application Data

(63) Continuation of application No. PCT/US2021/020484, filed on Mar. 2, 2021.

(51) Int. Cl.
| H05K 5/30 | (2025.01) |
| G06F 1/16 | (2006.01) |
| H04M 1/02 | (2006.01) |
| H05K 5/02 | (2006.01) |

(52) U.S. Cl.
CPC ............ *H05K 5/30* (2025.01); *G06F 1/1624* (2013.01); *G06F 1/1658* (2013.01); *H04M 1/0254* (2013.01); *H05K 5/0256* (2013.01)

(58) Field of Classification Search
CPC ..... H05K 5/30; H05K 5/0256; H04M 1/0254; G06F 1/1654; G06F 2200/1635
See application file for complete search history.

(56) References Cited

U.S. PATENT DOCUMENTS

| 6,137,686 A | * | 10/2000 | Saye | ..................... G06F 1/1626 |
| | | | | 361/732 |
| 2003/0007321 A1 | | 1/2003 | Dayley | |
| 2004/0100776 A1 | * | 5/2004 | Haas | ................... H04M 1/0256 |
| | | | | 361/729 |

(Continued)

FOREIGN PATENT DOCUMENTS

WO    2010028394    3/2010

OTHER PUBLICATIONS

International Search Report and Written Opinion dated Nov. 18, 2021, International Application No. PCT/US2021/020484.

(Continued)

*Primary Examiner* — Allen L Parker
*Assistant Examiner* — Dakota M Talbert

(57) ABSTRACT

The present technology discloses a frameless modular multi-functional electronic device. The electronic device includes a base module with a processor and multiple component modules, at least one of which is configured to connect directly in contact with the base module. The modules each include a connecting member to slidably align and mate the component modules together, and an electrical interface to transmit digital information and energy between connected base and component modules. The component modules are interchangeably connected directly in contact with each other and, when assembled, form the frameless modular multi-functional electronic device.

20 Claims, 9 Drawing Sheets

(56) References Cited

U.S. PATENT DOCUMENTS

2007/0208892 A1* 9/2007 Betts-Lacroix ........... G06F 1/16
710/62
2008/0211772 A1* 9/2008 Loucks ................. G06F 1/1656
345/173

OTHER PUBLICATIONS

International Preliminary Report on Patentability dated Sep. 14, 2023, International Application No. PCT/US2021/020484.

* cited by examiner

SYSTEM AND METHOD FOR A FRAMELESS MODULAR ELECTRONIC DEVICE

CLAIM OF PRIORITY

This application is a continuation of, and claims priority to, PCT Patent Application No. PCT/US2021/020484, entitled "SYSTEM AND METHOD FOR A FRAMELESS MODULAR ELECTRONIC DEVICE", filed Mar. 2, 2021, which application is incorporated by reference herein in its entirety.

FIELD

This disclosure generally relates to a modular electronic device, and in particular, to a frameless modular electronic device.

BACKGROUND

Different types of modular computing devices have been designed over the years, each having their own benefits and drawbacks. Despite the different designs that have been contemplated, modular computing devices remain uncommon in the marketplace. There are many practical difficulties with modular designs. Insertion and removal of a module in many designs requires precision, and is not easily accomplished by many individuals. Thus, it is not well suited for everyday use. Moreover, modular devices tend to have a lower durability than non-modular devices. That is, it has been conventionally difficult to create a modular structure where modules are easy to insert and remove, while being sturdy enough for everyday use. Finally, modular devices have heretofore been limited by the frame or structure they are housed in. This limits the type and size of modular devices.

SUMMARY

According to one aspect of the present disclosure, there is a frameless modular multi-functional electronic device, comprising a base module comprising a processor; a plurality of component modules, at least one of which is configured to connect directly in contact with the base module, each of the component modules and the base module comprising a connecting member configured to slidably align and mate the component modules together; an electrical interface configured to transmit digital information and energy between connected base and component modules; and the component modules configured to be interchangeably connected directly in contact with each other and, when assembled, form the frameless modular multi-functional electronic device.

Optionally, in any of the preceding aspects, the assembled frameless modular multi-functional electronic device is a unitary structure, the unitary structure comprising an outer boundary defined by the outermost component modules or base module.

Optionally, in any of the preceding aspects, the outer boundary is scalable by addition and removal of component modules.

Optionally, in any of the preceding aspects, a removed one of the component modules from the unitary structure operates as a single functional electronic device.

Optionally, in any of the preceding aspects, the connecting member includes a magnet to secure the connecting member when assembled.

Optionally, in any of the preceding aspects, the magnet is located on an edge of the connecting member.

Optionally, in any of the preceding aspects, the electrical interface is a physical data interface.

Optionally, in any of the preceding aspects, the physical data interface is a USB or a Firewire connection.

Optionally, in any of the preceding aspects, the electrical interface is a wireless data interface.

Optionally, in any of the preceding aspects, the wireless data interface is a Bluetooth connection.

Optionally, in any of the preceding aspects, the connecting member includes a male portion.

Optionally, in any of the preceding aspects, the connecting member includes a female portion in which to slidable receive the male portion.

Optionally, in any of the preceding aspects, the connecting member includes a tongue and groove connection.

Optionally, in any of the preceding aspects, the base and component modules are variable in size and shape.

Optionally, in any of the preceding aspects, the digital information includes data or software, and the energy includes battery power.

Optionally, in any of the preceding aspects, the assembled frameless modular multi-functional electronic device is a handheld electronic device.

Optionally, in any of the preceding aspects, each of the component modules includes a display.

Optionally, in any of the preceding aspects, each of the component modules is slidably released from another of the component modules.

According to another aspect of the present disclosure, there is a method of assembling a frameless module multi-functional electronic device, comprising selecting a base module, the base module including a processor; attaching a component module directly in contact with the base module, the attaching comprising slidably aligning and mating the component module with the base module using a connecting member; transmitting digital information and energy between connected base and component modules via an interface; and forming the frameless module multi-functional electronic device when the base module and the component module are assembled together in electrical contact with each other.

Optionally, in any of the preceding aspects, the method further comprising sharing digital information and energy between the component module and the base module when assembled.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

The present disclosure will now be described with reference to the figures, which generally relate to a frameless, multi-functional modular electronic device.

A user may assemble the electronic device by connecting multiple modules together. Modules may be a base module or a component module. A base module is a module that includes components necessary to preserve core competence of an electronic device. Component modules may be any other type of module that may be connected to the base module and/or other component modules to form the electronic device. Individual base and component modules may have different sizes and shapes, as well as different functionality. Since no frame or housing exists, the electronic device may be designed in any size or shape, with any functionality. Together, the modules may operate as a unitary structure or independently as separate modules. For example, connected modules may together operate as a smartphone or a television. In one example, when a module is removed from the unitary structure, the module may then operate independently. For example, the removed module may be a camera that was part of the smartphone or a remote control for the television. Modules may also be interchanged or swapped with other modules. In one embodiment, devices are connected using a connecting member, such as a USB style connector or an HDMI style connector. Connectors may also transfer digital information and/or energy between modules.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications, and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1:
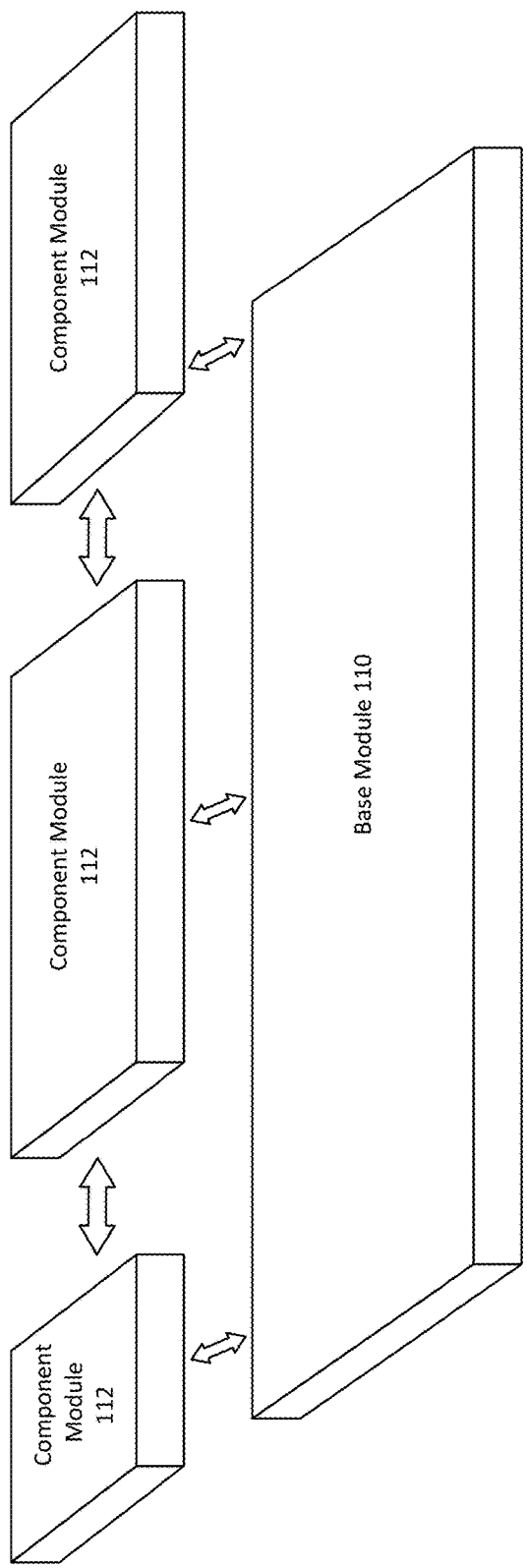
FIG. 1 illustrates an example of a frameless electronic device composed of multiple electronic modules.

FIG. 1 illustrates an example of a frameless modular electronic device composed of multiple electronic modules. The example frameless modular electronic device of the present disclosure includes modules that may be connected to one another to form the electronic device 100. When assembling the modules to form the electronic device 100, a frame or housing or other independent connecting structure is not required to mate or connect the modules. Instead, the modules may include a connecting member or interface that may be used to align and mate the modules in which to interface and interact with one another as the electronic device 100. It is appreciated that any number of modules may be used to form the electronic device 100, and the disclosure is not limited to the disclosed embodiment.

As illustrated, the electronic device 100 is comprised of a base module 110 and one or more component modules 112. The component modules 112 are configured for connection to the base module 110 and other component modules 112 in which to form the electronic device 100. In one embodiment, the component modules 112 are removably connected to the base module 110 and/or another of the component modules 112 to form the electronic device 100. By connecting modules in this manner, a user may design and assemble any number of different electronic devices. For example, the base and component modules 110 and 112 may be configured to form a tablet, a laptop, a media player, a camera, a measurement device, a gaming system, a vehicular computing device, a set-top box, a television, a wearable device, etc.

In one embodiment, the electronic device 100 may be assembled in any number of different shapes or sizes since there is no frame, housing or other connecting structure required during assembly. Moreover, the base and component modules 110 and 112 are interchangeable, removable and replaceable, enabling users to create the electronic device 100 with varied form and functionality. The shape and size of the assembled electronic device 100 is not constrained by any structure. Rather, the shape and size of the electronic device 100 is only limited by the size and shape of or the number of base and component modules 110 and 112 used to form the electronic device 100. For example, a user may connect a base module 110, such as a processor module, and component modules 112, such as a camera module, a flash memory module, a battery module, and a touchscreen LCD module to form a small and lightweight camera. The user could later add a cell-phone radio module and a microphone/speaker module to create a camera phone. The size and shape (and functionality) of the camera or camera phone is not limited and may vary depending on the size of each individual module and/or based on the number of individual modules used to form the electronic device 100.

Base and component modules 110 and 112 may include, but are not limited to, any number of different mechanical or electronic components. Such components may be any suitable type of computing device, mobile device or phone, navigation or positioning system, display, touch screen, keyboard, wireless device, interface, wearable computing component (e.g., watch or fitness tracker), controller, game interface, camera, sensor, monitoring device (e.g., pulse monitor), card reader, microphone, speaker, memory, battery, connection or mating member, data collection component, amplifier, and the like without limitation. As noted, the modules can be interchangeable, swappable or otherwise connect or interface with other modules to form the electronic device 100.

In one embodiment, the base module 110 includes hardware and/or software components required to maintain core competency of the of the electronic device 100. For example, if the electronic device is being configured as a smartphone, a processor, memory, display and communications interface may be core components of the base module 110 that are necessary for operation and function of the electronic device 100. Modules such as a camera or flash-light may be considered non-core components that may be connected using a corresponding component module.

As described above, the base module 110 and component modules 112 may work together as a unitary electronic device 100 when assembled. For example, an assembled embodiment of the base module 110 and component module 112 may serve as a smartphone or a tablet. The component modules 112 (and the base module 110) may also operate independently as sole components. For example, an individual component module 112 may function independently as a battery or a remote control. Examples of a unitary electronic device 100 and sole components follow in the various embodiments below.

Figure 2:
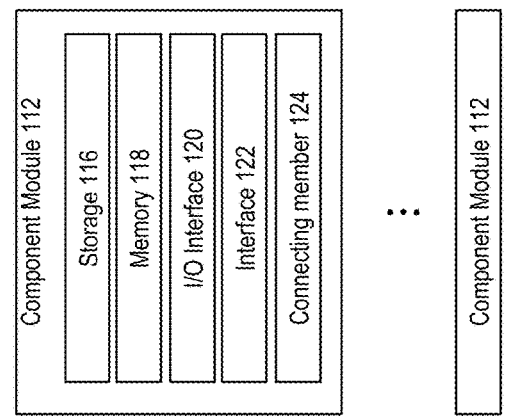
FIG. 2 illustrates example component and base modules in accordance with FIG. 1.
Figure 2:
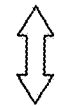
Figure 2:
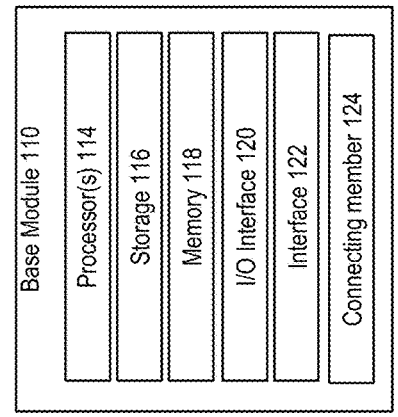

FIG. 2 illustrates example component and base modules in accordance with FIG. 1. As illustrated, a single base module 110 may be connected or mated with one or more component modules 112 that, when assembled, form the electronic device 100. The base module 110 and component module 112 may include a processor(s) 114, storage 116, memory 118, input/output (I/O) interface 120, interface 122 and connecting member 124. As depicted, base module 110 includes the processor 114 and component module 112 does not. However, the base and component modules 110 and 112 may include any combination of components, including those not shown.

The processor 114 can include any suitable processing device, such as a microprocessor, microcontroller, integrated circuit, logic device, or other suitable processing device. For example, processor 114 may be used to run operating system applications, firmware applications, media playback applications, media editing applications, or any other application. In other embodiments, the processor 114 may drive a display and process inputs received from a user interface.

The storage 116 may include, for example, one or more storage mediums including a hard-drive, solid state drive, flash memory, permanent memory such as ROM, any other suitable type of storage component, or any combination thereof. The storage 116 may store, for example, media data (e.g., music and video files), application data (e.g., for implementing functions on a client device), firmware, authentication information (e.g., libraries of data associated with authorized users), wireless connection information (e.g., information that may a client device to establish a wireless connection), and any other suitable data or any combination thereof.

The memory 118 may be computer-readable media, including, but not limited to, non-transitory computer-readable media, RAM, ROM, hard drives, flash drives, or other memory devices. The memory 118 can store information accessible by the processor 114, including computer-readable instructions that can be executed by the processor 114. In some embodiments, the memory 118 can also be used for storing data used to operate electronic device applications, or any other type of data that may be stored in storage 116. In some embodiments, memory 118 and storage 116 may be combined as a single storage medium.

The I/O interface 120 may provide inputs to input/output circuitry of the base module 110 or component module 112. Input/output interface 120 may include any suitable input interface, such as for example, a button, keypad, dial, a click wheel, or a touch screen. In some embodiments, the base module 110 or component module 112 may include a capacitive sensing mechanism, or a multi-touch capacitive sensing mechanism. In some embodiments, input interface can include a microphone or other audio input interface for receiving a user's voice inputs. The input interface can include an analog to digital converter for converting received analog signals corresponding to a voice input to a digital signal that can be processed and analyzed to identify specific words or instructions.

In some embodiments, I/O interface 120 can instead of or in addition to include one or more interfaces for providing an audio output, visual output, or other type of output (e.g., haptic output). For example, I/O interface 120 can include one or more speakers (e.g., mono or stereo speakers) built into the base module 110 or component module 112, or an audio connector (e.g., an audio jack or an appropriate Bluetooth connection) operative to be coupled to an audio output mechanism. I/O interface 120 may be operative to provide audio data using a wired or wireless connection to a headset, headphones, or earbuds. As another example, I/O interface 120 can include display circuitry (e.g., a screen or projection system) for providing a display visible to the user. The display can include a screen (e.g., an LCD screen) that is incorporated into the base module 110 or component module 112, a movable display or a projecting system for providing a display of content on a surface remote from the base module 110 or component module 112 (e.g., a video projector), or any other suitable display.

The interface 122 can include any suitable components for communicating digital information and/or energy between base and component modules. In one embodiment, the interface 122 comprises a connecting member 124. The interface 122 may also include suitable components for interfacing with one or more networks, including for example, transmitters, receivers, ports, controllers, antennas, etc. For example, the interface 122 may be utilized to communicate wirelessly between base and component modules 110 and 112 or with an external device. In some embodiments, one or more of components may be combined or omitted (e.g., combine storage and memory). In some embodiments, the base module 110 or component module 112 may include other components not combined or included in the depicted embodiment (e.g., location circuitry, sensing circuitry, a power supply, etc.), or several instances of the components as illustrated.

The interface 122 can be operative to create or connect to a communications network. The interface 122 can be capable of providing wireless communications using any suitable short-range or long-range communications protocol. For example, communications circuitry (not shown) can support Wi-Fi (e.g., an 802.11 protocol), Bluetooth™, radio frequency systems (e.g., 1200 MHz, 2.4 GHz, and 5.6 GHz communication systems), infrared, protocols used by wireless and cellular phones and personal email devices, or any other protocol supporting wireless communications. The interface 122 may instead or in addition be capable of providing wired communications, for example using any suitable port on one or both of the devices (e.g., 30-pin, USB, FireWire, Serial, or Ethernet).

In one embodiment, the base module 110 may be wirelessly connected or in communication with one or more component modules 112 in which to exchange information. For example, the electronic device 100 may be assembled as a gaming console, where the gaming console has removable component modules acting as controllers. Or the electronic device 100 may be assembled as a television, with a component module that is a remote control.

Figure 3A:
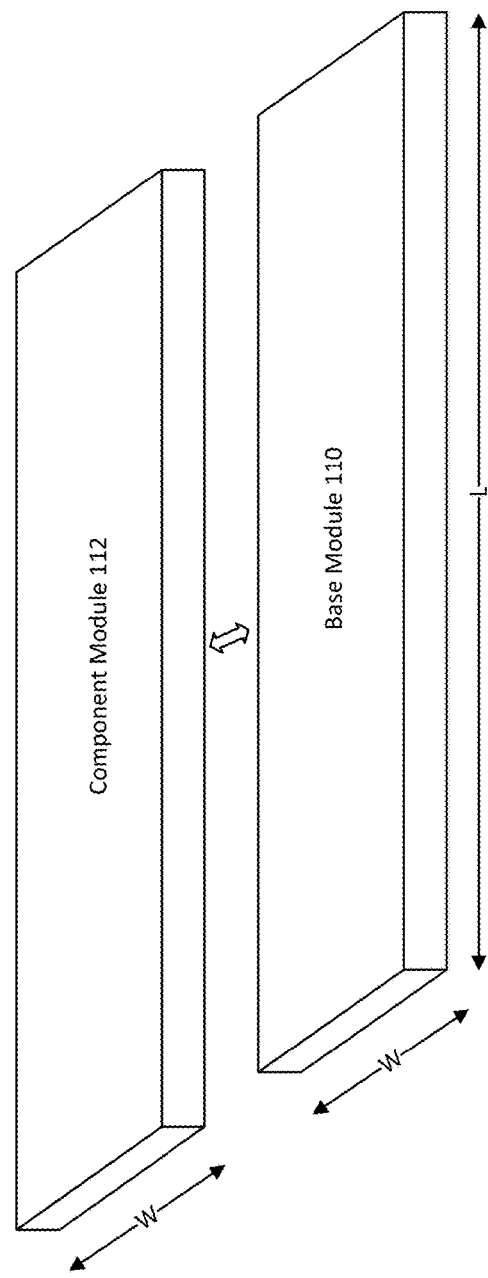
FIGS. 3A and 3B illustrate example embodiments of base and component modules.
Figure 3B:
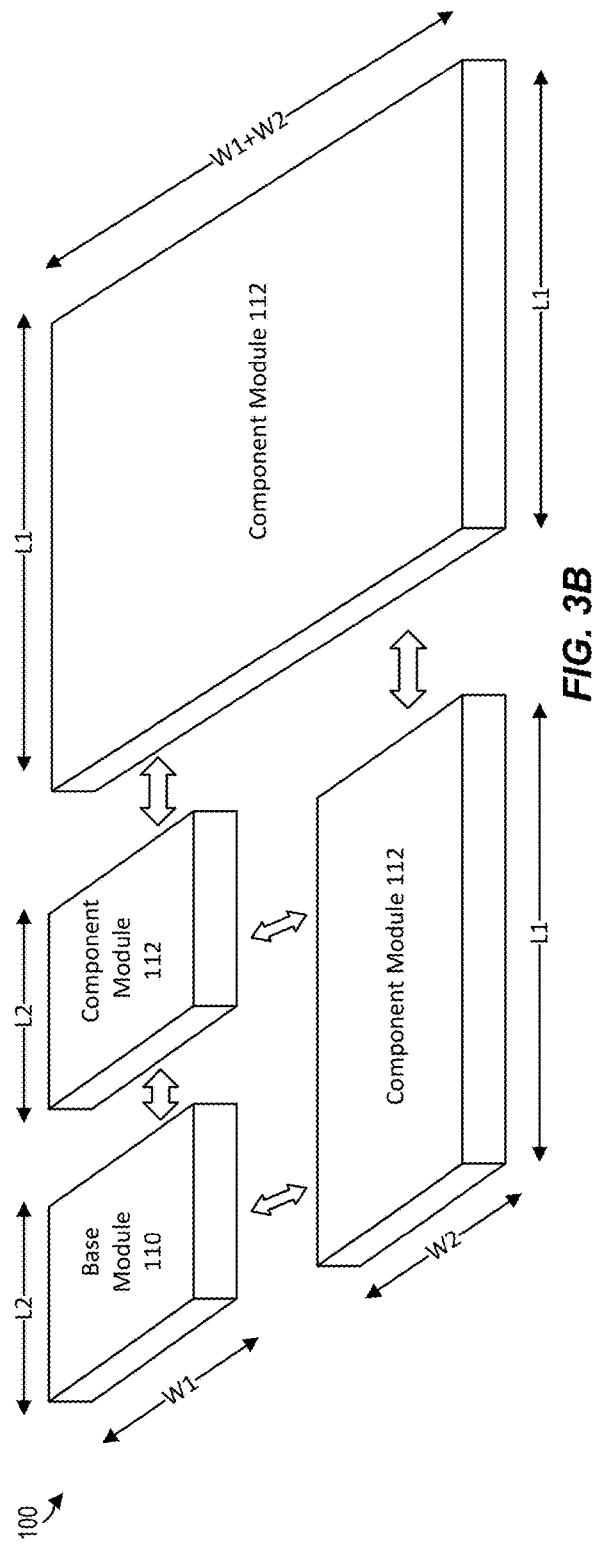

FIGS. 3A and 3B illustrate example embodiments of base and component modules forming the electronic device. As shown, the frameless electronic device is a multi-functional modular device composed of base and/or component modules 110 and 112. The electronic device may be reconfigured in any number of different shapes and sizes since modules are connected using a connection member 124. As the electronic device 100 is reconfigured, the outer boundary dimensions also change. In one embodiment, the modules are comprised of rectangular, triangular, or other-shaped modules in a golden ratio. The modules created by adding or removing a "square" are golden rectangles, where the side lengths of the rectangular modules are in golden ratio. This provides a user with the capability of creating a flexible device for assembly, where the user can choose modules necessary to form a specific embodiment of the electronic device 100.

The assembly of the electronic device 100 is compatible with a large range of module types. Modules may serve any function or purpose as long as they are capable of connecting to and communicating with the base module 110 and/or component module 112. Some example module types include sensor modules, processor modules, storage modules, communication modules, display modules, and power modules. Examples of sensor modules include accelerometer modules, GPS modules, camera modules, depth imaging modules, fingerprint reader modules, biometric modules, microphone modules, digital/analog input modules, haptic input modules, infrared flash modules, pedometer modules, barometer modules, magnetometer modules, and gyroscope modules. Examples of processor modules include application processor modules and graphics processor modules. Examples of storage modules include flash memory modules and RAM modules. Examples of communication modules include Wi-Fi radio modules, GSM/CDMA radio modules, HDMI connector modules, NFC modules, Bluetooth radio modules, and USB connector modules. Examples of display modules include touchscreen LCD modules and e-ink display modules. Examples of power modules include battery modules, solar panel modules, and battery charging modules. Note that these example module types are in no way exhaustive or exclusive; i.e., modules may incorporate functionality from many of these example types or from none at all, and modules may additionally, or alternatively incorporate functionality not herein described.

For example, and with reference to FIG. 3A, the electronic device 100 may be a selection of any of the modules described above. These modules (i.e., base module 110 and component module 112) may be connected to each other in such a manner to form the electronic device 100. For example, the base module 110 may function as a keyboard and the component module 112 may function as a display, such that the unitary structure operates as a smartphone. Alternatively, the base and component modules 110 and 112 may both be a display, such that the unitary structure operates as a tablet.

In the depicted embodiment, the base module 110 and the component module 112 are the same shape and size. The electronic device 100, when assembled, is a unitary structure in which the outermost modules define an outermost boundary. In particular, the outer boundary dimensions of the assembled electronic device 100 is defined by the length (L) and the combined width (W+W) of base module 110 and component module 112. It is also appreciated that although the base and component modules 110 and 112 may be the same shape and size, their functionality may be different.

Turning to the example depicted in FIG. 3B, there is a single base station 110 and three component modules 112 that together form the electronic module 100. For example, the base module 110 may be a processing module and the three component modules 112 may respectively be a camera module, a WiFi radio module and a display module. When assembled, the modules may form, for example, a smartphone. As shown, each of the component modules 112 have a different shape and size that are defined by a length and a width. The electronic device 100 (e.g., smartphone), when assembled, has outer boundary dimensions defined by the combined length (L1+L1) of the component modules 112 and the combined width (W1+W2) of component module 112 and base module 110.

In one embodiment, the electronic device 100 is modified into a new type of electronic device 100 by removal of a module (e.g., the rightmost component module 112 with length L1 and width W1+W2). After removal, the electronic device 100 will have a new shape and/or size. For example, when the rightmost depicted component module 112 is removed from the electronic device 100, the remaining three modules (i.e., base module 110 and two component modules 112) form an electronic device 100 with a new shape and size. Accordingly, the electronic device 100 will also have a new outer boundary. In this instance, while the size and shape of the electronic device 100 changes, each of the individual modules remain the same size and shape. For example, the reconfigured electronic device 100 now has outer boundary dimensions defined by the length (L1) and the width (W1+W2). In a further embodiment, the removed (single) component module 112 may function independently as an electronic device 100, such as a small tablet or a mobile device. In this case, the dimensions of the outer boundary are defined by the component module 112 itself, where L1 is the length and W1+W2 is the width. As appreciated, since the modules are connected using a connecting member 124 (and not a frame, housing or other structure), the outer boundary dimensions of the electronic device 100 may be reconfigured without limitation by addition or removal of modules.

Figure 4:
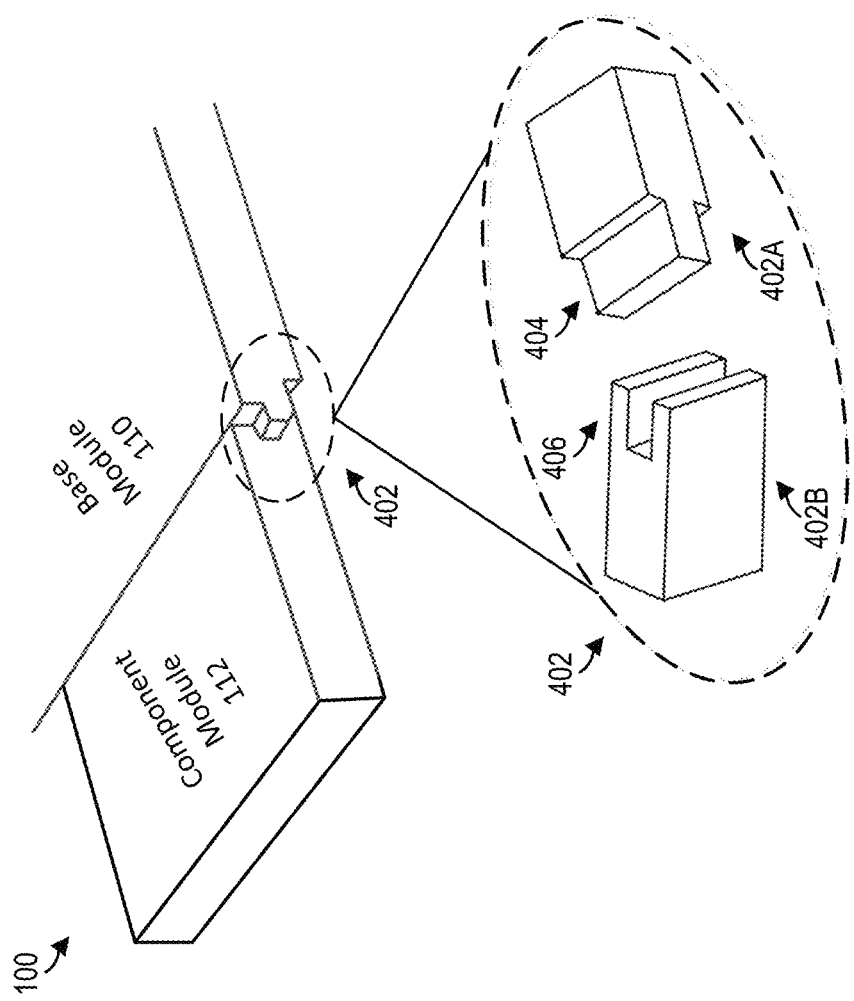
FIG. 4 illustrates an example connecting member of the base and component modules.

FIG. 4 illustrates an example connecting member of the base and component modules. The connecting member 402 connects and mates two or more modules together. The connecting member 402 also provides a mechanism in which to transfer digital information (e.g., data) and energy (e.g., power) between modules of the electronic device 100. More than one connecting member 402 may exist on a single module.

To connect modules, the connecting member 402 may be slidable, insertable or otherwise connectable. The connecting member 402 may include, but are not limited to, any one or more of the following components: a power-transfer connector electrically connected to the power-source component that allows components to draw power; and an I/O connector communicatively connected to the base module 110 that includes a processor to communicate with component modules 112. Connections may be indirectly or directly made via wired or wireless technology. In one embodiment, the connecting member 402 is a single connector. In another embodiment, the connecting member 402 is more than one connecting member 402. In still another embodiment, the connecting member 402 may be a multi-pin style connector that has pins assigned for data transfer and charging passthrough, or any other connector or technology that supports communication/power-transfer between devices.

In one example embodiment, a tongue and grove system may be used to connect or mate modules by sliding or aligning the connecting member 402 of one module to the connecting member 402 of another module, as shown in the electronic device 100, as depicted. In the example, a connecting member 402 on each module (e.g., a connecting member 402 on based module 110 and a connecting member 402 on component module 112) together form a connecting assembly such that the connecting assembly connects or mates the two modules. In one embodiment, as shown, the connecting assembly may include a pair of USB connecting members—e.g., USB male connecting member 404 and USB female connecting member 406. The USB male connecting member 404 includes a male protruding portion 402A, and the USB female connecting member 406 includes a female receiving portion 402B. The edges of the male protruding portion 402A and/or female receiving portion 402B may include a magnetic portion (e.g., a magnet) to ensure that the USB connecting members 404 and 406 are securely connected to each other when assembled, while allowing the connecting members 404 and 406 to be removably attached. In one embodiment, the magnetic portion secures the connection of modules in one or more directions along any one of three dimensional directions. For example, a magnet may secure the connection in an x-axis direction, e.g., a sliding direction. In another example, the magnet may align two connecting modules in a z-axis direction, i.e., a sliding direction. In still another embodiment, magnets may or may not be used when the connection is secured using other forms of securing mechanisms. For example, a magnetic portion may not be necessary to secure a connection mated using a tongue and groove connection. In one embodiment, the tongue and groove mechanism may be supplemented with the magnetic portion. Other forms of securing a removable connection may also be utilized, such as a latch or latching mechanism, an actuatable hook, a spring loaded retention member, an electromechanical actuating lock, etc.

In one embodiment, the connecting member 402 provides an interface in which to transmit and share digital information (e.g., data) and/energy (e.g., power). For example, the connecting member 402 may be a HDMI connector, a USB connector, a Firewire connector or the like, which allows modules to share and transfer digital information and/or energy. The connecting member 402 can also provide bi-directional communications between modules via one or more electrical, magnetic (e.g., inductive), or optical couplings between the interface and the corresponding module. As an example, the interface of each module can include a number of complementary pairs of prongs, pins, contacts, or the like to form a number of serial data connections or other forms of data connection, including the wireless transfer of data, e.g., via Bluetooth.

Each of the modules can removably receive another module via the connecting member 402. For example, the base module 110 can receive a component module 112, such as a camera module, and the component module 112 may receive another component module 112 (not shown), such as a wireless network interface module (e.g., a Wi-Fi interface module, a cellular data module, or a short-range wireless radio module, such as a Bluetooth module). Various other modules can be received as well, such as, for example, a positioning system module (e.g., a GPS module); a battery module, an antenna module, or various other types of modules. Further, the electronic modules can be interchangeable, swappable, or otherwise insertable into various different other modules without using a frame, housing or other connecting structure.

Data transfer between modules in the electronic device 100 allows for data communication whenever modules are communicatively coupled to each other, either in a wired or wireless manner. Communications between modules may be a direct communication. Direct communication refers to data transfer that does not require an intermediary module for communication. Communications may also additionally or alternatively be an indirect communication. For example, one module may communicate with another module through an intermediary module. In one example embodiment, the communication member 402 may be configured to transfer data using capacitive pads, or through use of current conduction. In further examples, the data interface may be configured to transfer data using an optical interface (e.g., laser diode/photodiode pair), a high-frequency (e.g., 60 GHz) RF, or near-field magnetic communications.

In one embodiment, the connecting member 402 may also distribute or transfer energy (e.g., power) between modules. For example, a connecting member 402 may be configured to provide power to a module, or to receive power from a module (e.g., a module may be configured to generate power, such as through use of inductive charging coils, photovoltaics and fuel cells). In one embodiment, a power module enables power transfer between modules by connecting each module connecting member 402 to a common power bus, or may additionally or alternatively enable direct power transfer between modules using any alternative connection architecture (e.g., a switched power architecture). Power modules may be in different forms or types, such as a power consuming module (e.g., camera, display), a power producing module (e.g., charger, solar panel), a power storing module (e.g., batteries, capacitors) or any combination thereof. In one embodiment, additional power modules may be connected to the electronic device, or power modules may be removed and swapped from the electronic device. In a further embodiment, a removed power module may operate independently. For example, the power module may be charged for later use by the electronic device 100.

Figure 5A:
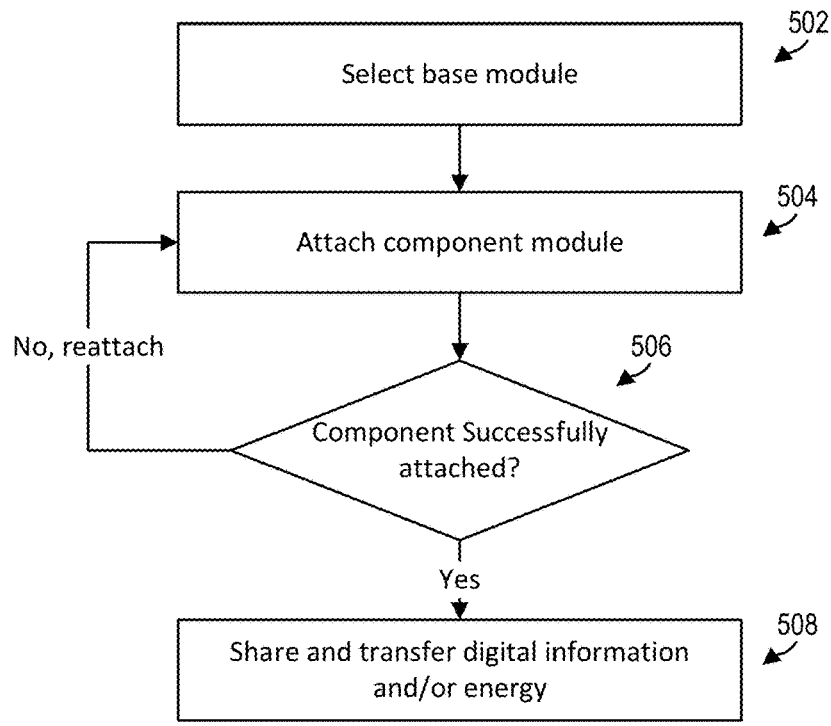
FIG. 5A illustrates an example flow chart for assembling a frameless modular multi-functional electronic device.

FIG. 5A illustrates an example flow chart for assembling a frameless modular multi-functional electronic device. The process begins at step 502, where a base module 110 is selected by a user as a core component of the electronic device 100. The core component is a component that includes software and/or hardware necessary to the functionality and operation of the electronic device 100. For example, the base module 110 (more than one may be selected) may include processing circuitry and wireless communication circuitry when a mobile device is being created. Since the electronic device 100 may be assembled to function and operate as many different devices, the selected base module 110 (i.e., core component) may include different software and/or hardware dependent upon the specific electronic device 100 being assembled.

Once the base module 110 has been selected, component modules 112 may be added or attached to create the electronic device 100, at step 504. As discussed above, component modules 112 may be initially added to the base module 110 by connecting or mating the modules using the connecting member 402. As additional component modules 112 are attached, the component modules 112 may connect or mate to one another using the connecting member 402. Assembling the electronic device 100 in this fashion—connecting modules together using a connecting member, as opposed to a frame, housing or other structure, enables the user to construct a scalable device that is not limited by any boundaries. That is, the assembled electronic device 100 may be formed in any shape or size as it is not constrained by any other structure. Instead, the boundary of the assembled electronic device 100 is determined based on the outer boundary of the assembled modules themselves.

At step 506, the base module 110 (or any other processing module) may determine whether a newly added component has been successfully attached (i.e., whether the connection is working properly). For example, when a component module 112 is mated or connected to the base module 110, the base module 110 may verify that the connection is successful. In one embodiment, the base module 110 verifies the success of mating with another module when energy (e.g., power) is successfully transferred between modules. In another embodiment, the base module 110 verifies the success of mating with another module when digital information (e.g., data) is successfully transferred between modules. If an indication of a successful connection is received by the base module 110, the process proceeds to step 508. In another embodiment, if the base module 110 does not receive any indication that the connection is successful, the connection verification may timeout, and the process returns to step 504.

At step 508, after a successful connection of modules, the base module 110 and the component module 112 may begin to transfer and share digital information (e.g., data) and energy (e.g., power), as detailed above.

Figure 5B:
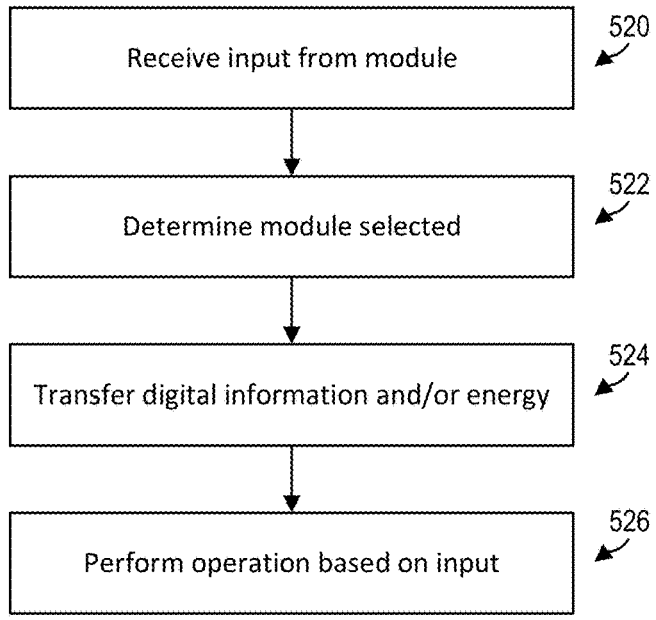
FIG. 5B illustrates an example flow chart of receiving information from a module and performing an operation consistent with the information.

FIG. 5B illustrates an example flow chart of receiving information from a module and performing an operation consistent with the information. At step 520, the base module 110 or the component module 112 receives a user input. For example, the component module 112 includes a display with a touch sensor. The user touches a portion of the display which causes a particular gesture to be detected as an input by the touch sensor of the display.

At step 522, the base module 110 (or other module capable of processing) receives information detected as input by the user in step 520, and determines which module sent the information. For example, based on the received information, the base module 110 may identify the module (e.g., the component module 112 with the display and touch sensor) that is associated with the location of touch of the electronic device 100. In one embodiment, the location of the module may be determined by receipt of a signal or indication from one module to another module. For example, the signal or indication may identify the specific module that sent the signal or indication. In another embodiment, the location of the module may be determined based on an understanding of the manner in which the electronic device 100 was assembled. For example, as each module is connected when assembling the electronic device 100, the base module 110 may store a table or list of modules and their respective direct connections to other modules. This table or list may then be later referenced to determine the location. It is appreciated that other mechanisms for "recording" the location of modules in the electronic device 100 may be used and is not limited to the disclosed embodiment.

The base module 110 may then transfer digital information and/or energy based on the module determined to have sent the information, at step 524. For example, a display on a module may include an input sensor that has capacitive sensors positioned within a display of the module. When the display is touched by a user, the module is operable to detect a change in capacitance at one or more of the capacitive sensors due to touching the display. This information (e.g., data) may be transmitted to the base module 110 for performance of an appropriate action or response, at step 526.

At step 526, an operation may be performed based on the input at the component module 112. For example, and following the example above, if the user intended to open an App on the display of the module when touching the display, then the base module 110 may process the information to execute and open the App on the display of the module.

Figure 5C:
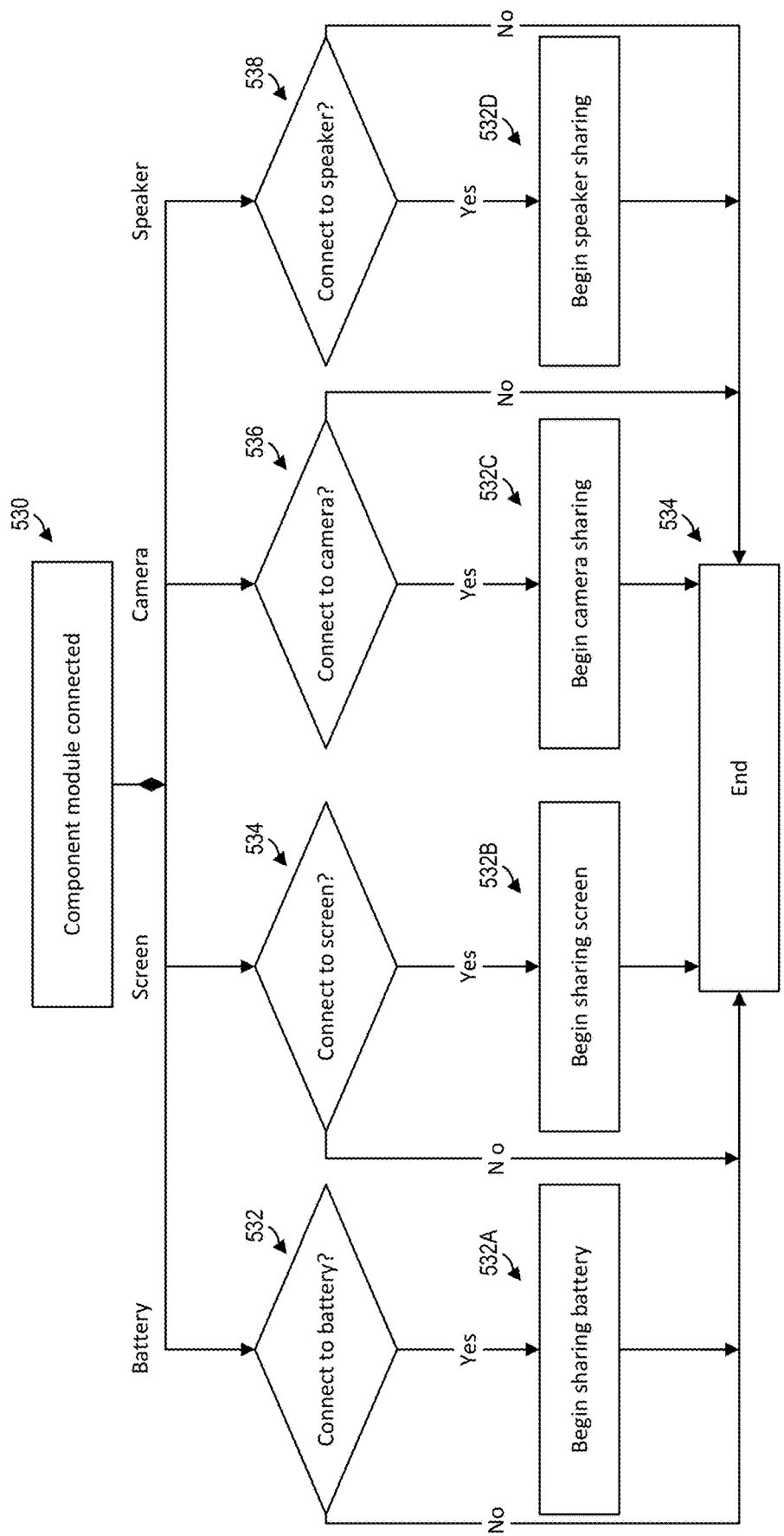
FIG. 5C illustrates an example flowchart of module selection and connection in accordance with FIGS. 5A and 5B.

FIG. 5C illustrates an example flowchart of module selection and connection in accordance with FIGS. 5A and 5B. In the disclosed flowchart, four different component modules 112 (e.g., a battery module, a screen module, a camera module and an amplifier module) are shown. As appreciated, any number of different modules may be selected and connected and is not limited to the disclosed modules or embodiment.

As component modules 112 are selected and connected at step 530, the base module 110 (or other module capable of processing) determines whether components have been successfully connected, as discussed above in step 506 of FIG. 5A. This figure illustrates another, more detailed example of step 506 when multiple component modules are connected to form the electronic device 100. As noted above, when a component module 112 is mated or connected to the base module 110, the base module 110 may verify that the connection is successful.

In the example of a battery module, the base module 110 first verifies that the battery module has been successfully mated or connected with another module. Once verified, the battery module is determined to be connected as part of the electronic device 100. At step 532, the base module 110 determines whether the battery module should have an active or passive connection. For example, the base module 110 may determine the current power level (e.g., battery level) of the electronic device 100 and/or whether another power source is supplying power to the electronic device 100. If additional power is not required, then the base module 110 may determine that sharing the battery module is unnecessary and end at step 534. Alternatively, if the base module 110 determines that additional power is required, the battery module may begin to share power with the electronic device 100 at step 532A.

In the example of a screen module, the base module 110 verifies whether the connection of the screen module is successful, similar to the battery module. At step 534, the base module 110 determines whether the screen module should have an active or passive connection. For example, the base module 110 may determine whether any information requires display on the screen module. If the base module 110 determines there is information for display on the screen module, then an active connection to the screen module may be established at step 534. Once established, the screen module may be used to display the information at step 532B. Otherwise, if the base module 110 determines that the screen module is not necessary for displaying information, then the connection may be passive, and the process ends at step 534. For example, the screen module may be turned off or placed in sleep mode to conserve power until needed.

In the example case of a camera module, the base module 110 verifies whether the connection of the camera module is successful, similar to the battery module. At step 536, the base module 110 determines whether the camera module should have an active or passive connection. For example, the base module 110 may determine whether a user is in the process of taking a photograph or video. If the base module 110 determines that a photograph or video is being taken, then an active connection to the camera module may be established, at step 536. Once established, the camera module may be used to take photographs and videos at step 532B. Otherwise, if the base module 110 determines that the camera module is not needed, then the connection may be passive, and the process ends at step 534. For example, the camera module may be turned off or placed in sleep mode until needed.

In the example of a speaker module, the base module 110 verifies whether the connection of the speaker module is successful, similar to the battery module. At step 538, the base module 110 determines whether the speaker module should have an active or passive connection. For example, the base module 110 may determine the user is operating an App that requires audio. If the base module 110 determines audio is required, then an active connection to the speaker module may be established at step 538. Once established, the speaker module may be used to play the audio at step 538B. Otherwise, if the base module 110 determines that the speaker module is not needed, then the connection may be passive, and the process ends at step 534. For example, the speaker module may be turned off or placed in sleep mode when no audio is being played.

FIGS. 6-8C illustrate example embodiments of an electronic device. As illustrated in the various embodiments, the electronic device 100 may be assembled in many different arrangements to form many different types of devices. Moreover, as shown in some embodiments, separate modules may serve as a separate electronic device 100 or a component of the electronic device 100. In still another embodiment, components of the electronic device 100 may serve to assist each other.

Figure 6:
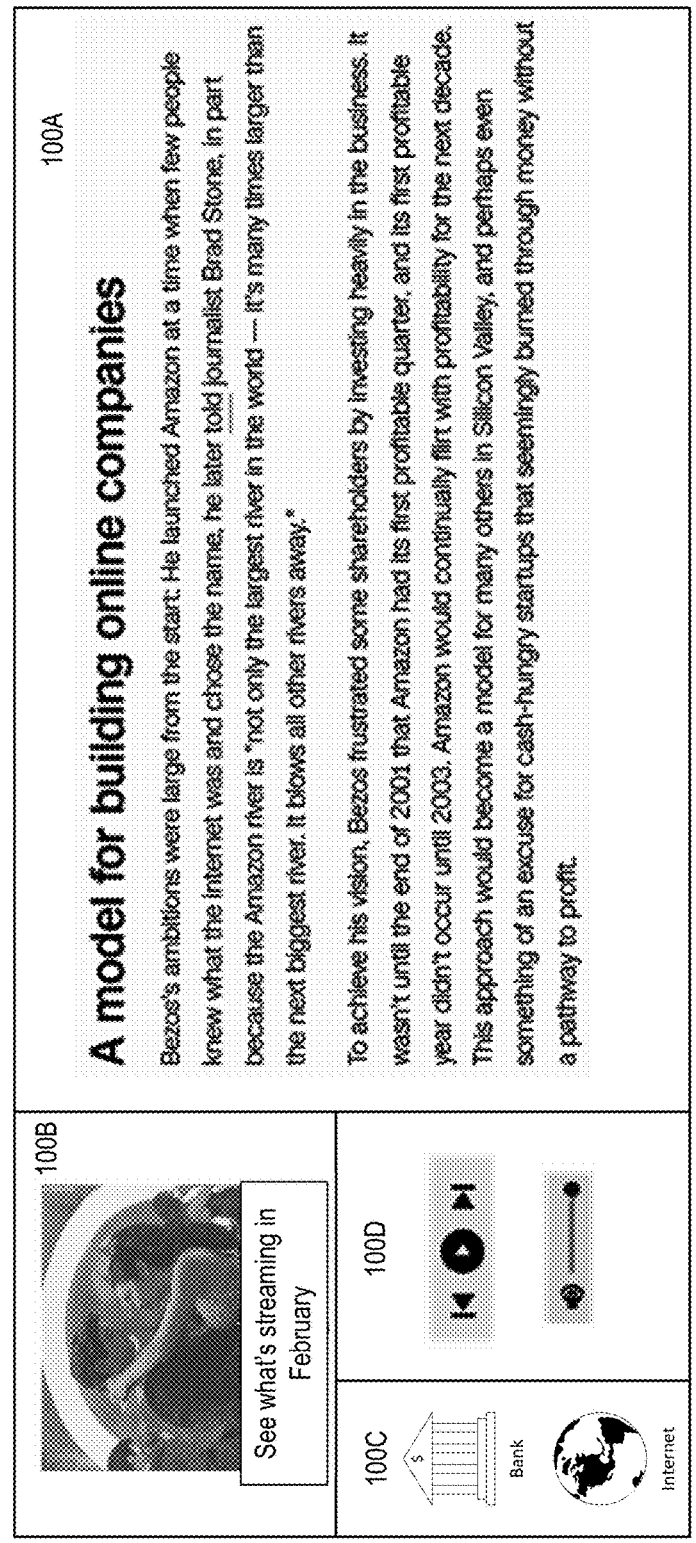
FIGS. 6-8C illustrate examples of an electronic device in accordance with embodiments of the disclosure.

Turning to the example of FIG. 6, an electronic device 100 may be assembled using separate components that work together to achieve a collective purpose. For example, N base and/or component modules 110 and 112 may be mated or connected to form a unitary electronic device 100. In particular, the depicted electronic device 100 is a single display device comprised of four display modules 100A, 100B, 100O and 100D that when connected form the unitary electronic device 100 (e.g., display device). In one example embodiment, the display modules 100A, 100B, 100O and 100D may form multi-tasking split screens, where display module 100A is an active window and display modules 100B, 100O and 100D are passive windows. For example, the assembled display device allows one main task (e.g., display module 100A) and multiple small tasks (e.g., display modules 100B, 100O, 100D) to be displayed.

Figure 7:
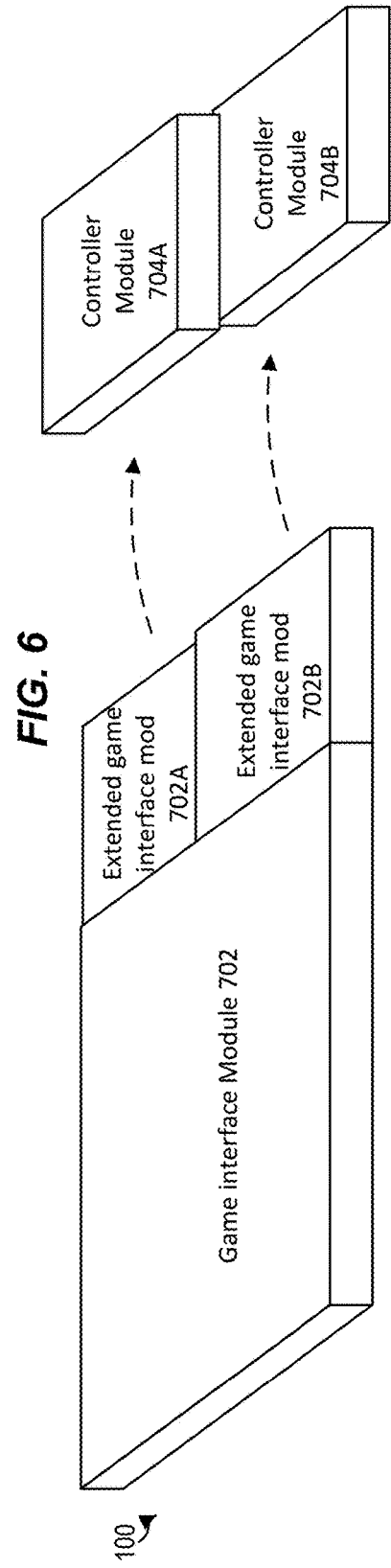

In the example embodiment of FIG. 7, modules forming an assembled, unitary electronic device 100 may be separated into N multiple electronic devices or components for use with the electronic device 100. For example, as shown, the electronic device 100 may consist of a game interface module 702 and extended game interface modules 702A and 702B. In one example embodiment, the extended game interface modules 702A and 702B may be removed from the game interface module 702. The extended game interface modules 702A and 702B, upon removal, may become (or be reconfigured as) game controllers 704A and 704B for use with the game interface module 702. When reconnected to the game interface module 702, the controller modules 704A and 704B may again be reconfigured (return to original state) as the extended game interface modules 702A and 702B. Other examples include the removed extended game interface modules 702A and 702B being reconfigured as a watch, a camera or the like. In one embodiment, the game interface module 702 may be reconfigured. For example, the game interface module 702 may be configured as a mobile phone, and the extended game interface modules may become the watch and camera modules. Any number of different embodiments may exist, and the disclosure is not limited to the described embodiments.

Figure 8A:
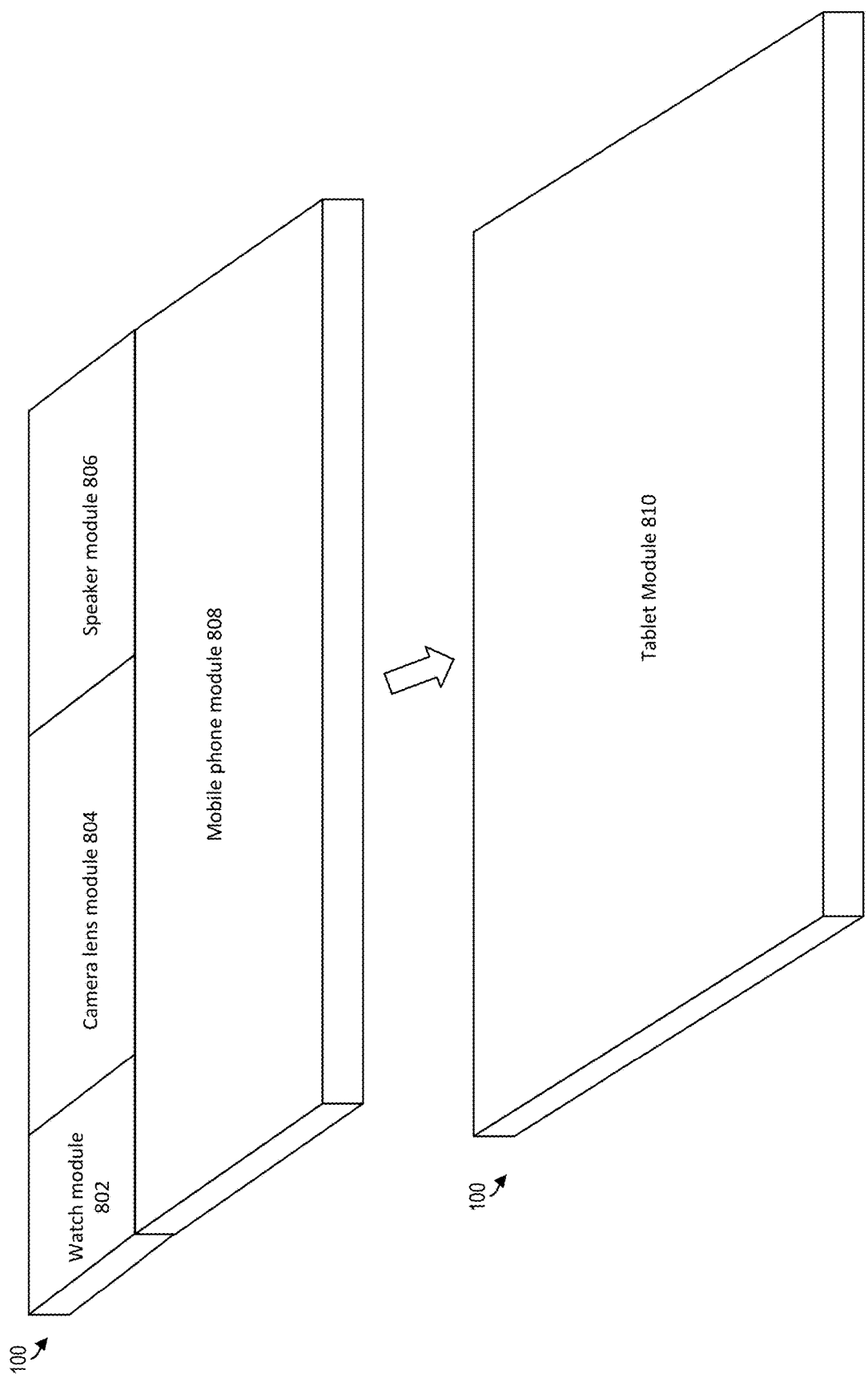

The embodiment illustrated in FIG. 8A discloses another example of multiple modules working as a unitary electronic device 100. In one embodiment, the individual modules may be configured or reconfigured for independent module operation while remaining assembled as the electronic device 100. For example, and for purposes of discussion, the electronic device 100 may be a smartphone. In particular, the smartphone may include a watch module 802, a camera lens module 804 a speaker module 806, and a mobile phone module 808. The modules of the smartphone may operate collectively as shown, or the modules may be removed from the smartphone and operated individually, for example, as a watch or camera or speaker. Alternatively, the individual modules (e.g., the mobile phone module, the watch module, camera lens module and speaker module) may be reconfigured such that the collective modules operate as a tablet module 810.

Figure 8B:
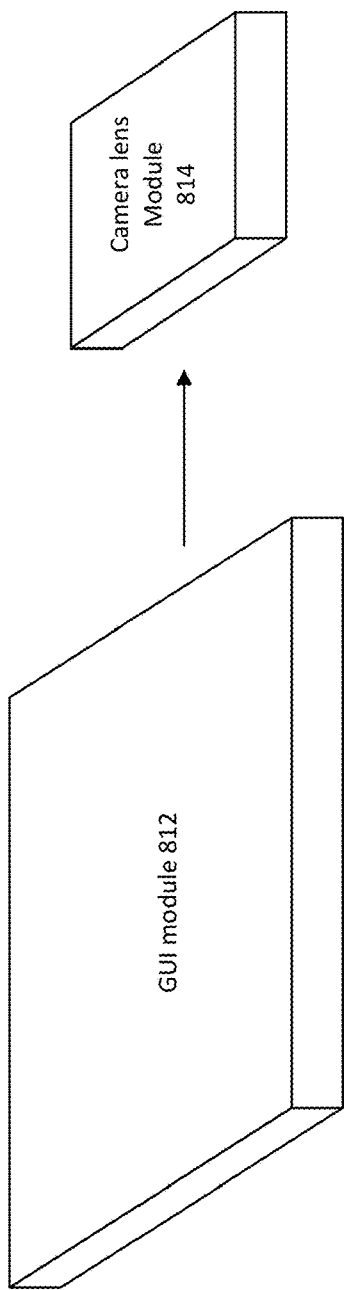

In FIG. 8B, an example of augmenting an individual module with another module is illustrated. For example, graphical user interface (GUI) module 812 may be augmented by camera lens module 814. In one embodiment, the GUI module 812 may be removably connected with the camera lens module 814. In another embodiment, the GUI module 812 and camera lens module 814 may be removably attached to one another. When removed from each other, the modules still augment one another. For example, the modules may continue to operate together via a wireless connection. For instance, the camera lens 814 may be removed from the GUI module 812, but may be remotely controlled by the GUI module 812 to take photographs.

Figure 8C:
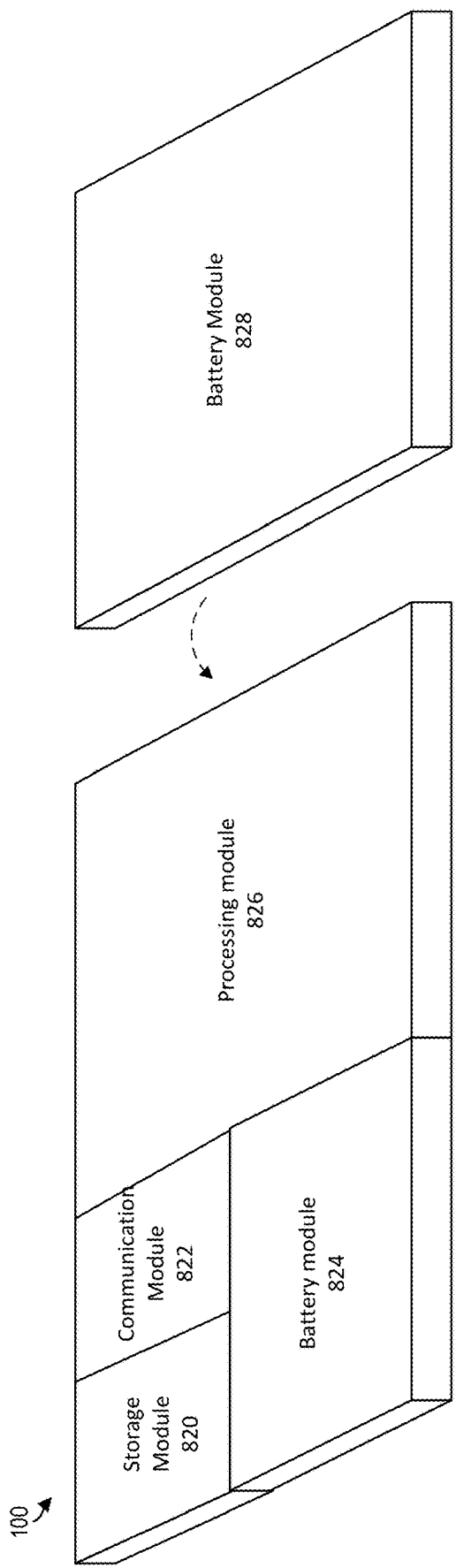

In still one other embodiment, as shown in FIG. 8C, interchangeable modules (N modules) serve and assist each other. In this example, modules may be swapped or changed to assist other modules. For example, the electronic device 100 consists of four modules—a storage module 820, a communication module 822, a battery module 824 and a processing module 826. As the battery module 824 runs low on power, it may be exchanged with a new battery, such as battery module 828. Alternatively, a second battery may be added to the electronic device 100 by swapping the processing module 824 with the battery module 828 or adding the battery module 828 to the electronic device 100. The new battery module 828 may serve to charge battery module 824 and/or provide power to each of the other modules on the electronic device 100.

Figure 9:
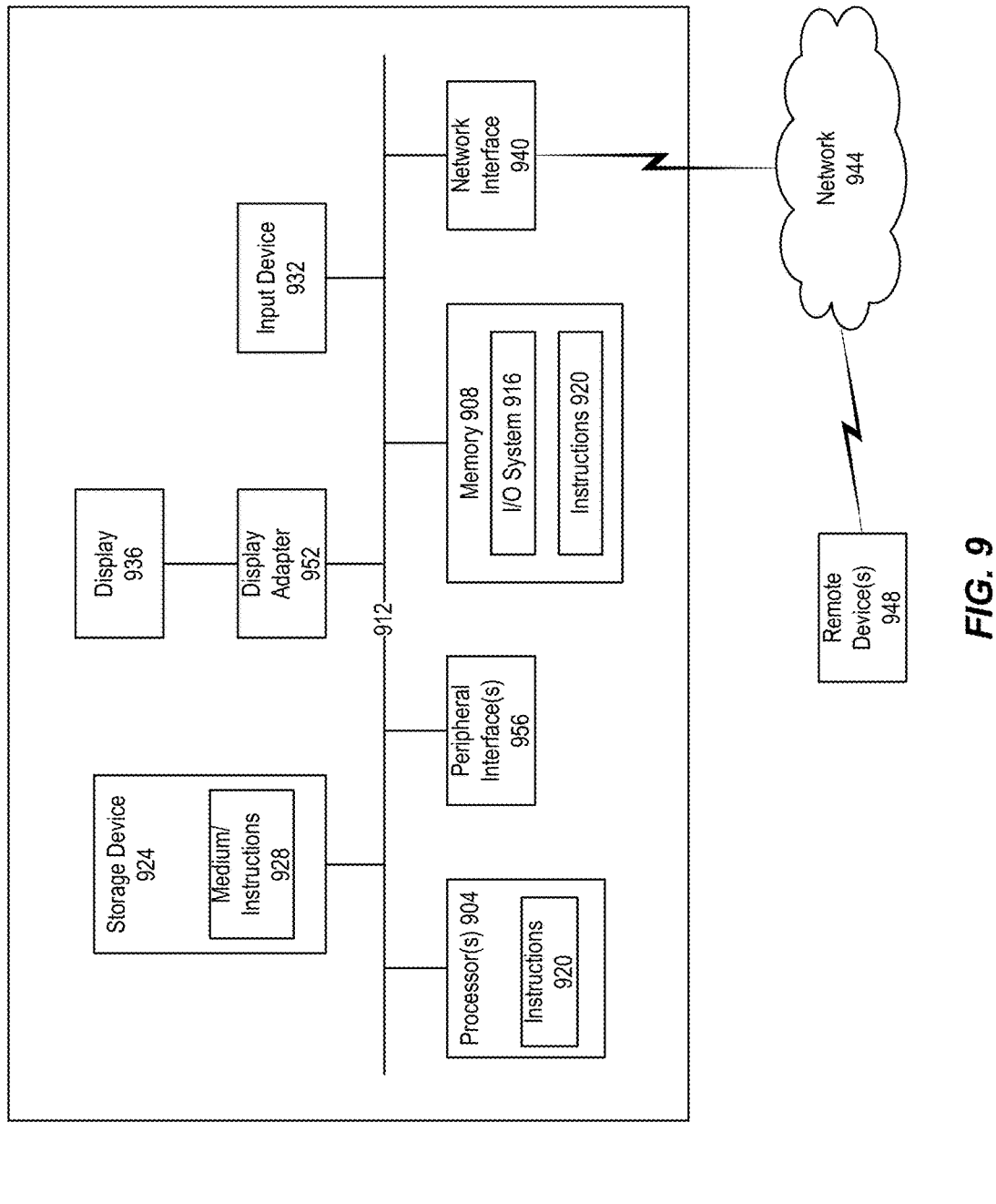
FIG. 9 illustrates a schematic diagram of a general-purpose network component or computer system.

FIG. 9 shows an example embodiment of a computing system for implementing embodiments of the disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Memory 908 may include various components (e.g., machine-readable media) including, but not limited to, a random-access memory component, a read-only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, instructions 920 may reside, completely or partially, within machine-readable medium 928. In another example, instructions 920 may reside, completely or partially, within processor 904.

Computer system 900 may also include an input device 932. In one example, a user of computer system 900 may enter commands and/or other information into computer system 900 via input device 932. Examples of an input device 932 includes, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, instructions 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications, and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The non-transitory computer-readable media includes all types of computer readable media, including magnetic storage media, optical storage media, and solid-state storage media and specifically excludes signals. It should be understood that the software can be installed in and sold with the device. Alternatively, the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Computer-readable storage media (medium) exclude (excludes) propagated signals per se, can be accessed by a computer and/or processor(s), and include volatile and nonvolatile internal and/or external media that is removable and/or non-removable. For the computer, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A frameless modular multi-functional electronic device, comprising:
    a base module comprising a processor, the base module having a first length and a first width;
    a plurality of component modules, at least one of which is configured to connect directly in contact with the base module, at least one of the component modules having a different size or shape than the base module such that at least one of the component modules has a second length and a second width, each of the component modules and the base module comprising
        a connecting member configured to slidably align and mate the component modules together;
        an electrical interface configured to transmit digital information and energy between connected base and component modules; and
    the component modules configured to be interchangeably connected directly in contact with each other and the base module, wherein when assembled, the base module and the plurality of component modules when connected form the frameless modular multi-functional electronic device with a length equal to the first length plus at least the second length, and a width equal to the first width plus the second width.

2. The electronic device of claim 1, wherein the assembled frameless modular multi-functional electronic device is a unitary structure, the unitary structure comprising an outer boundary defined by the outermost component modules or base module.

3. The electronic device of claim 2, wherein the outer boundary is scalable by addition and removal of component modules.

4. The electronic device of claim 3, wherein a removed one of the component modules from the unitary structure operates as a single functional electronic device.

5. The electronic device of claim 1, wherein the connecting member includes a magnet to secure the connecting member when assembled.

6. The electronic device of claim 5, wherein the magnet is located on an edge of the connecting member.

7. The electronic device of claim 1, wherein the electrical interface is a physical data interface.

8. The electronic device of claim 7, wherein the physical data interface is a USB or a Firewire connection.

9. The electronic device of claim 1, wherein the electrical interface is a wireless data interface.

10. The electronic device of claim 9, wherein the wireless data interface is a Bluetooth connection.

11. The electronic device of claim 1, wherein the connecting member includes a male portion.

12. The electronic device of claim 11, wherein the connecting member includes a female potion in which to slidable receive the male portion.

13. The electronic device of claim 1, wherein the connecting member includes a tongue and groove connection.

14. The electronic device of claim 1, wherein the base and component modules are variable in size and shape, wherein base and component modules are rectangular and have said lengths and widths in golden ratio.

15. The electronic device of claim 1, wherein the digital information includes data or software, and the energy includes battery power.

16. The electronic device of claim 1, wherein the assembled frameless modular multi-functional electronic device is a handheld electronic device.

17. The electronic device of claim 1, wherein each of the component modules includes a display.

18. The electronic device of claim 1, wherein each of the component modules is slidably released from another of the component modules.

19. A method of assembling a frameless module multi-functional electronic device, comprising:
    selecting a base module, the base module including a processor and having a first length and a first width;
    attaching a component module directly in contact with the base module, the component module having a second length and a second width different than the base module, the attaching comprising
        slidably aligning and mating the component module with the base module using a connecting member;
        transmitting digital information and energy between connected base and component modules via an interface; and
    forming the frameless module multi-functional electronic device when the base module and the component module are assembled together in electrical contact with each other wherein when assembled, the base module and the component module form the frameless module multi-functional electronic device with an outer boundary having a length equal to the first length plus at least the second length, and a width equal to the first width plus at least the second width.

20. The method of claim 19, further comprising sharing digital information and energy between the component module and the base module when assembled.

* * * * *